US010658652B2

(12) United States Patent
Komura et al.

(10) Patent No.: US 10,658,652 B2
(45) Date of Patent: May 19, 2020

(54) METHOD OF MANUFACTURING LITHIUM-ION SECONDARY BATTERY ELECTRODE SHEET

(71) Applicant: TOYOTA JIDOSHA KABUSHIKI KAISHA, Toyota-shi, Aichi (JP)

(72) Inventors: Shingo Komura, Okazaki (JP); Kunihito Arai, Yokohama (JP); Taku Matsumura, Yokohama (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 116 days.

(21) Appl. No.: 15/506,795

(22) PCT Filed: Aug. 21, 2015

(86) PCT No.: PCT/JP2015/004225
§ 371 (c)(1),
(2) Date: Feb. 27, 2017

(87) PCT Pub. No.: WO2016/031220
PCT Pub. Date: Mar. 3, 2016

(65) Prior Publication Data
US 2017/0256780 A1    Sep. 7, 2017

(30) Foreign Application Priority Data
Aug. 29, 2014  (JP) ................. 2014-175920

(51) Int. Cl.
*H01M 4/04*  (2006.01)
*H01M 10/0525*  (2010.01)
*H01M 4/139*  (2010.01)

(52) U.S. Cl.
CPC ....... *H01M 4/0435* (2013.01); *H01M 4/0404* (2013.01); *H01M 4/139* (2013.01); *H01M 10/0525* (2013.01); *Y02T 10/7011* (2013.01)

(58) Field of Classification Search
CPC .................................................. H01M 4/0435
See application file for complete search history.

(56) References Cited

U.S. PATENT DOCUMENTS

2005/0241137 A1* 11/2005 Suzuki ............... H01G 9/042
29/592.1
2005/0271798 A1* 12/2005 Zhong ................ H01G 11/42
427/58
2009/0224198 A1*  9/2009 Mori ................. H01M 4/0404
252/62.3 Q
2012/0021282 A1*  1/2012 Katou ............... H01M 4/1391
429/211

(Continued)

FOREIGN PATENT DOCUMENTS

CN    100355118 C    12/2007
CN    101185149 A     5/2008

(Continued)

*Primary Examiner* — Austin Murata
(74) *Attorney, Agent, or Firm* — Sughrue Mion, PLLC (57) ABSTRACT

A method of manufacturing a lithium-ion secondary battery electrode sheet proposed herein includes the step of pressing granulated particles (13a), wherein the ratio (t/D50) is less than 1, where D50 is the mean particle size of the granulated particles (13a) and t is the thickness of a layer (14) of active material particles (13a1) after pressing.

9 Claims, 7 Drawing Sheets

(56) References Cited

U.S. PATENT DOCUMENTS

| | | | |
|---|---|---|---|
| 2013/0255074 A1* | 10/2013 | Uchida | H01M 4/0404 29/623.5 |
| 2014/0079872 A1 | 3/2014 | Uchida et al. | |
| 2014/0099538 A1 | 4/2014 | Johnson et al. | |

FOREIGN PATENT DOCUMENTS

| | | | |
|---|---|---|---|
| CN | 103250281 A | 8/2013 |
| JP | 7-116493 A | 5/1995 |
| JP | 09219190 A | 8/1997 |
| JP | 2004-79370 A | 3/2004 |
| JP | 2004247249 A | 9/2004 |
| JP | 2005-340188 A | 12/2005 |
| JP | 2007-95363 A | 4/2007 |
| JP | 2010097830 A | 4/2010 |
| JP | 2013-12327 A | 1/2013 |
| JP | 2013-143304 A | 7/2013 |
| JP | 2014-78497 A | 5/2014 |
| WO | 2006126665 A1 | 11/2006 |

* cited by examiner

METHOD OF MANUFACTURING LITHIUM-ION SECONDARY BATTERY ELECTRODE SHEET

CROSS REFERENCE TO RELATED APPLICATIONS

This application is a National Stage of International Application No. PCT/JP2015/004225 filed Aug. 21, 2015, claiming priority based on Japanese Patent Application No. 2014-175920 filed Aug. 29, 2014, the contents of all of which are incorporated herein by reference in their entirety.

TECHNICAL FIELD

The present invention relates to a method of manufacturing a lithium-ion secondary battery electrode sheet. In the present description, the term "secondary battery" refers to a repeatedly rechargeable battery in general. The term "lithium-ion secondary battery" refers to a secondary battery that uses lithium ions as the electrolyte ions and implements charging and discharging by the transfer of electric charge which is associated with the transfer of the lithium ions between the positive and negative electrodes. The lithium-ion secondary battery is one type of non-aqueous electrolyte secondary battery, which uses a non-aqueous electrolyte comprising a non-aqueous solvent in which an electrolyte salt is dissolved. The present application claims priority from Japanese Patent Application No. 2014-175920, filed on Aug. 29, 2014, the entirety of which is incorporated by reference into this specification.

BACKGROUND ART

JP 2004-079370 A, for example, discloses a method of obtaining an electrode sheet in which a layer of active material particles is formed on a current collector. The method involves coating the current collector with a mixture paste containing active material particles and a binder, drying the paste, and pressing the resultant material. In this fabrication method, the step of drying the mixture paste requires a large amount of energy, which increases the manufacturing cost.

JP 2014-078497 A discloses a method of manufacturing a lithium-ion secondary battery electrode sheet in which a layer of active material particles is formed on a current collector, by feeding particles containing the active material particles and a binder onto the current collector and then pressing the particles and the current collector. This manufacturing method can simplify or eliminate the drying step, and in that respect, it can keep the manufacturing cost low.

CITATION LIST

Patent Literature

[PTL 1]
JP 2004-079370 A
[PTL 2]
JP 2014-078497 A

SUMMARY OF INVENTION

Technical Problem

As disclosed in Patent Literature 1, in the manufacturing method in which a layer of active material particles is formed from the mixture paste, it is desirable to set the pressing pressure based on the weight of the mixture paste per unit area after drying and the thickness of the active material layer after pressing (i.e., the density of the active material layer). On the other hand, when the layer of the active material particles is formed from granulated particles, as disclosed in Patent Literature 2, the resulting layer of the active material particles may not have sufficient peel strength even if the pressing is carried out under the same conditions as those used in the case where the layer of the active material particles is formed from the mixture paste.

Solution to Problem

A method of manufacturing a lithium-ion secondary battery electrode sheet proposed herein includes the following steps 1 through 5:
1. Preparing a current collector.
2. Preparing granulated particles containing active material particles and a binder.
3. Feeding the granulated particles onto the current collector.
4. Leveling the granulated particles fed on the current collector.
5. Pressing the leveled granulated particles.

Here, in the step of feeding the granulated particles, it is desirable that the ratio (t/D50) be less than 1, where D50 is the mean particle size of the granulated particles fed onto the current collector and t is the thickness of a layer of the active material particles that has been formed subsequent to the step of pressing. This makes it possible to consistently obtain a lithium-ion secondary battery electrode sheet in which the formed active material particle layer has a high peel strength.

Moreover, it is preferable that the ratio (t/D50) be greater than 0.5. In this case, unevenness in the weight per unit area of the active material particles is likely to be kept small.

BRIEF DESCRIPTION OF DRAWINGS

FIG. 2 is a schematic view schematically illustrating a granulated particle 13a.

DESCRIPTION OF EMBODIMENTS

The following description is given to illustrate an example of the embodiments of a method of manufacturing a lithium-ion secondary battery electrode sheet proposed herein. The embodiments described herein are not intended to limit the present invention. The drawings are depicted schematically, and the dimensional relationship (length, width, thickness, and the like) in the drawings, for example, does not necessarily reflect actual dimensional relationship. The parts and components that exhibit the same effects are denoted by the same reference symbols, and repetitive description thereof may be omitted as appropriate.

<<Manufacturing Apparatus 10>>

Figure 1:
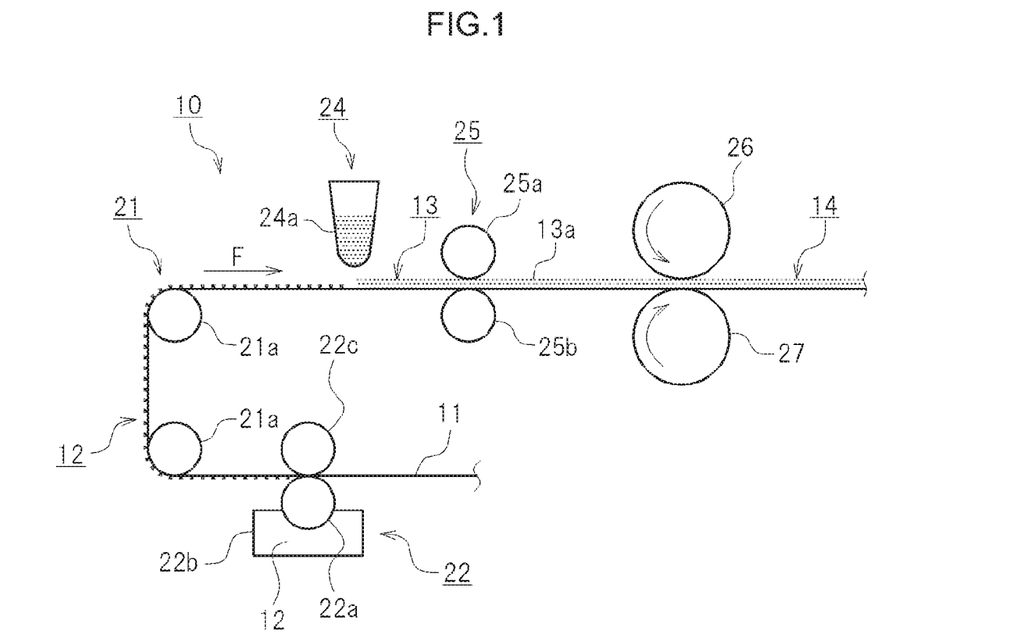
FIG. 1 is a schematic view illustrating a manufacturing apparatus 10 that embodies a method of manufacturing a lithium-ion secondary battery electrode sheet proposed herein.
Figure 2:
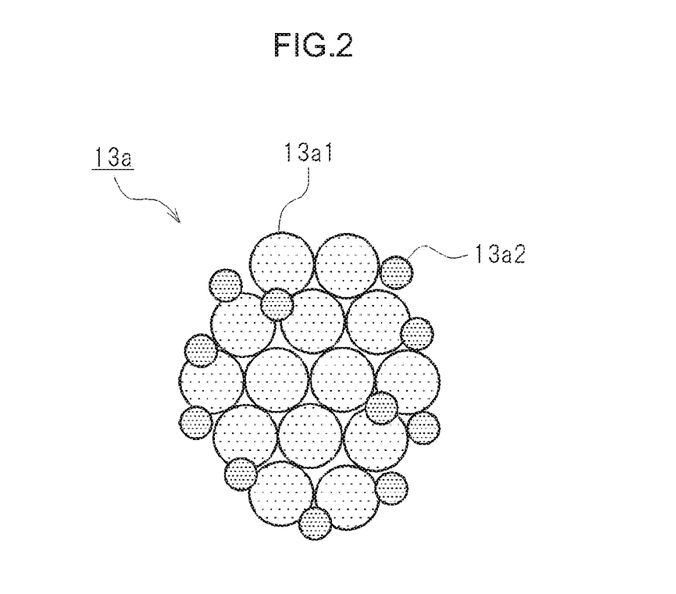

FIG. 1 is a schematic view illustrating a manufacturing apparatus 10 that embodies a method of manufacturing a lithium-ion secondary battery electrode sheet proposed herein. As illustrated in FIG. 1, the manufacturing apparatus 10 has a conveyor device 21, a coating device 22, a feeding device 24, a squeegee 25, and pressure rollers 26 and 27. The arrow F in the figure indicates the conveying direction, as appropriate. The conveyor device 21 is a device for conveying a current collector 11. The coating device 22 is a device for applying a binder solution 12. The feeding device 24 is a device for feeding granulated particles 13a (see FIG. 2). The details of these devices that constitute the manufacturing apparatus 10 will be described later. FIG. 2 is a view schematically illustrating the granulated particle 13a.

<<Method of Manufacturing a Lithium-Ion Secondary Battery Electrode Sheet>>

A method of manufacturing a lithium-ion secondary battery electrode sheet proposed herein includes the following steps 1 through 5:
1. preparing a current collector 11;
2. preparing granulated particles 13a containing active material particles and a binder;
3. feeding the granulated particles 13a onto the current collector 11;
4. leveling the granulated particles 13a fed on the current collector 11; and
5. pressing the leveled granulated particles 13a.

<<Step of Preparing the Current Collector 11>>

At step 1, the current collector 11 is prepared. The current collector 11 prepared here is a member for obtaining electricity in the electrode sheet. For example, the material suitable as the current collector 11 used for a lithium-ion secondary battery is a material that has good electron conductivity and is capable of existing stably within the battery. The current collector 11 also requires being lightweight, predetermined mechanical strength, processability, and so forth. For example, an aluminum foil is used as the current collector 11 for the positive electrode of a lithium-ion secondary battery. A copper foil is used as the current collector 11 for the negative electrode thereof. In the example shown in FIG. 1, a strip-shaped metal foil (specifically, an aluminum foil (thickness 15 µm) or a copper foil (thickness 10 µm)) is prepared as the current collector foil. Although not shown in the figure, it is desirable that the strip-shaped metal foil as the current collector foil be prepared in such a condition as to be coiled around a winding core.

The manufacturing apparatus 10 shown in FIG. 1 is provided with a step of conveying the strip-shaped current collector 11 along its longitudinal direction. Herein, the current collector foil 11 as the strip-shaped current collector is conveyed by the conveyor device 21 along a predetermined conveyance passage. Such a strip-shaped current collector foil 11 is suitable for subjecting it to a predetermined treatment while it is being conveyed in a roll-to-roll process, as illustrated in FIG. 1. It should be noted that the current collector need not be a metal foil. For example, depending on the use of the electrode sheet that is to be manufactured, the current collector 11 may be an electrically conductive resin film. In the present specification, the term "preparing" may mean, for example, obtaining a required material from a manufacturer of the material as appropriate.

<<Step of Preparing Granulated Particles 13a>>

At step 2, the granulated particles 13a are prepared. It is desirable that the granulated particles 13a prepared here contain at least active material particles 13a1 and a binder 13a2 (i.e., the first binder), as illustrated in FIG. 2. The granulated particles 13a can be obtained by, for example, granulating a mixture (suspension) in which the active material particles 13a1 and the binder 13a2 are mixed with a solvent by a spray drying method. In the spray drying method, the mixture is sprayed in a dry atmosphere. At this stage, the particles contained in each of the sprayed droplets are merged into roughly one aggregate and formed into a larger particle. Therefore, depending on the size of the droplets, the solid content contained in the granulated particle 13a can vary, and also, the size, mass, and the like of the granulated particle 13a can vary.

It is desirable that the droplets to be sprayed contain at least the active material particles 13a1 and the binder 13a2. It is also possible that the droplets to be sprayed may contain materials other than the active material particles 13a1 and the binder 13a2. For example, a conductive agent and/or a thickening agent may be contained therein. It is desirable that the granulated particles 13a prepared here have a mean particle size of from about 60 µm to 100 µm. In the present specification, the term "mean particle size" means a particle size at a cumulative volume of 50% in the particle size distribution determined by a laser scattering and diffraction method using a particle size analyzer, in other words, a 50% volume average particle size, unless otherwise specifically mentioned. Herein, the cumulative volume of 50% in the particle size distribution, i.e., the 50% volume average particle size, is called "D50" as appropriate. More specifically, the 50% volume average particle size is measured by a dry measurement method using a laser diffraction/scattering particle size analyzer (for example, Microtrac MT-320011, made by Nikkiso Co., Ltd.) without dispersing the particles by compressed air.

<Active Material Particle 13a1>

The method of manufacturing an electrode sheet proposed herein is applicable to various types of electrode sheets. For example, the method can be applied either to the positive electrode sheet or to the negative electrode sheet in a lithium-ion secondary battery. The active material particles 13a1 contained in the granulated particles 13a may vary depending on the electrode sheet to be manufactured. When an electrode sheet for the positive electrode of a lithium-ion secondary battery is manufactured, the active material particles for the positive electrode are used for the active material particles 13a1. On the other hand, when an electrode sheet for the negative electrode is manufactured, the active material particles for the negative electrode are used for the active material particles 13a1.

<Examples of Active Material Particles Used in Positive Electrode for Lithium-Ion Secondary Battery>

Herein, the lithium-ion secondary battery is taken as an example. Preferable examples of the active material particles 13a1 used in the positive electrode of the lithium-ion secondary battery include: oxides containing lithium and one or more transition metal elements (i.e., lithium-transition metal oxide), such as lithium nickel oxide (for example, $LiNiO_2$), lithium cobalt oxide (for example, $LiCoO_2$), and lithium manganese oxide ($LiMn_2O_4$); and phosphates containing lithium and one or more transition metal elements, such as lithium manganese phosphate ($LiMnPO_4$) and lithium iron phosphate ($LiFePO_4$). These are used in particulate form and may be referred to as positive electrode active material particles, as appropriate. The positive electrode active material particles may be used either alone or in combination. Because these positive electrode active material particles have low electrical conductivity, the positive electrode active material layer contains a conductive agent in order to enhance the electrical conductivity. In this case, it is desirable that the conductive agent be contained in droplets that are sprayed in spray drying.

<Examples of Active Material Particles Used in Negative Electrode of Lithium-Ion Secondary Battery>

Preferable examples of the active material particles used in the negative electrode of the lithium-ion secondary battery include carbon-based materials, such as graphite carbons and amorphous carbons, lithium-transition metal oxides, and lithium-transition metal nitrides. These are used in particulate form and may be referred to as negative electrode active material particles, as appropriate. The negative electrode active material particles may be used either alone or in combination. The negative electrode active material layer may contain a conductive agent in order to enhance the electrical conductivity. In this case, it is desirable that the conductive agent be contained in droplets that are sprayed in spray drying.

<Conductive Agent (Conductivity Enhancing Agent)>

Examples of the conductive agent include carbon materials, such as carbon powder and carbon fiber. It is possible to use one of the just-mentioned examples of the conductive agents either alone or in combination with another one or more of the examples. Examples of the carbon powder include powders of acetylene black, oil-furnace black, graphitized carbon black, carbon black, Ketjen Black, and graphite. Such conductive agents are preferably added when active material particles 13a1 with poor electrical conductivity are used to form conductive paths between the active material particles 13a1 and the current collector foil 11.

<Binder 13a2>

Next, the following describes the binder 13a2 that is to be added to the granulated particles 13a in the step of preparing granulated particles 13a. The granulated particles 13a are preferably granulated by a spray drying method. For this reason, a polymer that can be dissolved or dispersed in a solvent is used as the binder 13a2 that is to be added to the granulated particles 13a. Examples of the polymer that can be dissolved or dispersed in an aqueous solvent include rubber materials (such as styrene-butadiene copolymer (SBR) and acrylic acid-modified SBR resin (SBR latex)), vinyl acetate copolymers, and acrylate polymers. Examples of the polymer that can be dissolved or dispersed in a non-aqueous solvent include polyvinylidene fluoride (PVDF). It is also possible to use a cellulose-based polymer, a fluoropolymer (such as polytetrafluoroethylene (PTFE)), or the like, as the binder 13a2 that is to be added to the granulated particles 13a. Note that although examples of the binder 13a2 that is to be added to the granulated particles 13a are shown herein, the binder 13a2 that is to be added to the granulated particles 13a is not limited to the examples shown herein.

<<Step of Feeding Granulated Particles 13a>>

At step 3, the granulated particles 13a are fed onto the current collector 11. In this embodiment, a binder solution 12 is applied onto the current collector 11 before the granulated particles 13a are supplied, as illustrated in FIG. 1.

<<Step of Preparing Binder Solution 12>>

The binder solution 12 prepared here is a solution in which a binder is mixed with a solvent. From the viewpoint of reducing the environmental load, it is preferable to use what is called an aqueous solvent as the solvent for the binder solution 12. In this case, water or a mixed solvent mainly composed of water is used. The solvent of the binder solution 12 is not limited to what is called an aqueous solvent, but may be what is called an organic-based solvent. An example of the organic-based solvent is N-methylpyrrolidone (NMP).

It is also preferable that the binder contained in the binder solution 12 (i.e., the second binder) be one that can be dispersed in a solvent. In the present embodiment, preferable examples include styrene-butadiene rubber (SBR) and polyacrylic acid (PAA), because the solvent is an aqueous solvent. When an organic-based solvent is used as the solvent, preferable examples of the binder include polyvinylidene fluoride (PVDF) and polyacrylic acid (PAA). As a preferable example of the binder solution 12, it is desirable for the positive electrode of the lithium-ion secondary battery that water be used as the solvent and an acrylic resin (e.g., polymethyl methacrylate) as the binder be mixed with the solvent. For the negative electrode of the lithium-ion secondary battery, it is desirable that water be used as the solvent and SBR as the binder be mixed with the solvent.

<Step of Coating Binder Solution 12>

It is desirable that the binder solution 12 be applied onto the current collector 11 in a predetermined pattern. Here, the binder solution 12 is applied onto a predetermined region in the current collector 11. It is desirable that the binder solution 12 be applied thinly onto the current collector 11, for example, at a thickness of from about 1 μm to 20 μm, and be applied by gravure printing or the like. For example, a direct gravure roll coater can be used as the coating device 22. Such a coating device 22 allows the binder solution 12 to be transferred onto the current collector 11 by direct gravure printing using the gravure roller 22a having minute patterns engraved on the surface thereof. It is desirable that the gravure roller 22a have, for example, a plurality of grooves having a print depth of about from 10 μm to 30 μm (for example, 20 μm), a width of 50 μm, and a pitch of 200 μm, along an oblique line inclined with respect to the rotational axis. The pattern of grooves formed in the gravure roller 22a may be a horizontal striped pattern or a grid pattern. Although not shown in the drawings, the grid pattern may be, for example, such a pattern in which oblique lines are combined with a grid pattern. The horizontal striped pattern may be such that the binder solution 12 is applied along the width direction of the strip-shaped current collector 11 and at a predetermined interval along the length direction thereof. The width and the pitch of the grooves of the gravure roller 22a may be varied in a variety of ways.

In the example shown in FIG. 1, it is desirable that the strip-shaped current collector 11 be conveyed with the treatment surface to be coated with the binder solution 12 (i.e., the surface on which the active material layer is to be formed) facing downward, and that the gravure roller 22*a* be applied to the current collector 11 in such a condition. The lower side of the gravure roller 22*a* is immersed in the binder solution 12 stored in a reservoir 22*b*. In addition, a backing roller 22*c* is applied to the opposite side of the current collector 11 to the surface thereof with which the gravure roller 22*a* makes contact. Thereby, the binder solution 12 stored in the reservoir 22*b* is continuously transferred to the current collector 11 through the gravure roller 22*a*. It is desirable that the binder solution 12 be applied to the current collector 11 at a thickness of, for example, from about 1 μm to about 10 μm.

In the example shown in FIG. 1, the current collector foil 11 (strip-shaped current collector foil) is wrapped around the conveying roller 21*b* of the conveyor device 21 and is conveyed so that the treatment surface coated with the binder solution 12 faces upward. The feeding device 24, the squeegee 25, and the pressure rollers 26 and 27 are disposed in that order in the conveyance passage of the current collector foil 11.

<Feeding Device 24>

The granulated particles 13*a* are fed onto the current collector 11 by the feeding device 24. The feeding device 24 is provided with a hopper 24*a* for storing the granulated particles 13*a*. Although not shown in the drawings, it is desirable that the hopper 24*a* be provided with an adjusting device for adjusting the amount of the granulated particles 13*a* to be supplied. In this case, the hopper 24*a* should desirably adjust the feeding amount of the granulated particles 13*a* according to, for example, the conveying speed of the current collector 11, to feed an appropriate amount of the granulated particles 13*a* onto the current collector foil 11. Here, the granulated particles 13*a* are fed in the form of an aggregate (powder material 13) in which a plurality of granulated particles 13*a* are gathered.

<Squeegee 25>

At step 4, the granulated particles 13*a* that have been fed on the current collector foil 11 is leveled. In such a step, for example, the thickness of the granulated particles 13*a* fed on the current collector foil 11 (i.e., the thickness of the powder material 13 of the granulated particles 13*a*) is adjusted to be uniform. In this embodiment, the squeegee 25 is provided on the downstream side of the feeding device 24 (i.e., on the downstream side in the conveyance passage of the current collector foil). The squeegee 25 adjusts the thickness of the granulated particles 13*a* that have been fed on the current collector foil 11. For example, there is a gap between the squeegee member 25 and the current collector foil 11 to be conveyed, and the thickness of the granulated particles 13*a* that pass therethrough is adjusted according to the gap. In this embodiment, the squeegee 25 includes a roller squeegee 25*a* and a backing roller 25*b* that are disposed so as to sandwich the granulated particles 13*a* fed on the current collector foil 11 therebetween in the thickness direction. Note that although the squeegee 25 herein is composed of a roller-shaped member, it may be composed of a blade-shaped member. It is desirable that the gap between the squeegee 25 and the conveyed current collector foil 11 be adjusted to, for example, from about 100 μm to about 300 μm (preferably from about 150 μm to about 250 μm), although it may depend on the particle size and the weight per unit area (designed weight per unit area) of the granulated particles 13*a*.

<<Step of Pressing the Leveled Granulated Particles 13*a*>>

At step 5, the granulated particles 13*a* that have been leveled are pressed against the current collector 11. In this embodiment, the pressure rollers 26 and 27 are members for sandwiching the granulated particles 13*a* and the current collector foil 11 therebetween in the conveyance passage in which the strip-shaped current collector foil 13*a* is conveyed. In this case, it is desirable that the gap between the pressure rollers 26 and 27 be adjusted taking the thickness of the granulated particles 13*a* to be deposited on the current collector foil 11 into consideration. As a result, the granulated particles 13*a* is pressed against the current collector 11 with an appropriate force. With such a step, while the granulated particles 13*a* are destroyed, the number of contact locations of the binder 13*a*2 with the active material particles 13*a*1 and the current collector 11 is increased. Thus, a layer 14 of the granulated particles 13*a* is formed.

The present inventors have found that, as described previously, the manufacturing method of forming the layer 14 of the active material particles 13*a*1 on the current collector 11 using the granulated particles 13*a*, which involves a series of steps as described above, may not be able to obtain sufficient strength and sufficient adhesive strength in the resulting layer of the active material particles 13*a*1. More specifically, the layer 14 of the active material particles 13*a*1 is formed by leveling the granulated particles 13*a* fed on the current collector 11 and, in the step of pressing, pressing the leveled granulated particles 13*a* hard from above. At this stage, if the pressing pressure is adjusted so that the formed layer 14 of the active material particles 13*a*1 will have a predetermined density, the formed layer 14 of the active material particles 13*a*1 may not have sufficient strength and sufficient adhesive strength.

For example, as disclosed in Patent Literature 1, in the manufacturing method in which the layer of the active material particles is formed from a mixture paste, the pressing pressure may be determined based on the weight of the mixture paste per unit area after drying and the thickness of the active material layer after pressing (i.e., the density of the active material layer). However, in the manufacturing method in which the layer 14 of the active material particles 13*a*1 is formed from the granulated particles 13*a*, the formed layer 14 of the active material particles 13*a*1 may not have sufficient strength and sufficient adhesive strength even if the pressing pressure is set in the same way as in the case of forming the layer of the active material particles from a mixture paste.

According to the discovery by the present inventors, in the manufacturing method of forming the layer of the active material particles by drying and pressing a mixture paste coated on the current collector, the active material particles and the binder are dispersed in the coated mixture paste. Then, the drying is carried out with the binder having entered the gaps between the active material particles. Furthermore, the pressing is performed for the dried material, in which the binder has entered in the gaps between the active material particles. This ensures a sufficient contact area of the bonder with the active material particles and the current collector, so that sufficient bonding strength can be ensured between the active material particles and between the active material particles and the current collector. In this case, the pressing pressure may be determined based on the weight of the mixture paste per unit area and the thickness of the active material layer after pressing (i.e., the density of the active material layer). That is, in the manufacturing method in which the active material particle layer is formed from the mixture paste, the mixture layer is formed while the solvent (liquid) that forms the paste is being dried. In this case, the active material layer is adhered to the current collector to some degree before the step of pressing, because the number of contact points of the binder is increased in the step of drying.

In contrast, the granulated particles 13a are produced by spray-drying a mixture (suspension) containing the active material particles 13a1 and the binder 13a2, as described above. In this case, the binder 13a2 contained in the granulated particles 13a has been dried with the binder 13a2 adhering to the active material particles 13a1. Before the pressing, the granulated particles 13a are merely placed on the current collector 11. Under this condition, the active material particles 13a1 contained in a single granulated particle 13a are bonded to each other by the binder 13a2. However, different granulated particles 13a are not bonded to each other by the binder 13a2. When the layer 14 of the active material particles 13a1 is formed from the granulated particles 13a, it is necessary to bond the active material particles 13a1 contained in different granulated particles 13a to each other and the active material particles 13a1 to the current collector 11 with sufficient strength in the step of pressing. In other words, in the manufacturing method in which the layer 14 of the active material particles 13a1 is formed from the granulated particles 13a (i.e., in the case of powder molding), the granulated particles 13a that have been dried in advance are adhered to each other in the step of pressing, to form the layer 14 of the active material particles 13a1. For this reason, in order to ensure sufficient peel strength, adhesion must be brought about between the granulated particles 13a by the pressing.

The states of the active material particles 13a1 and the binder 13a2 prior to the pressing are different between the case where the layer 14 of the active material particles 13a1 is formed from the granulated particles 13a and the case where the layer of the active material particles are formed from a mixture paste (not shown). In addition, the mechanisms of how the active material particles 13a1 are bonded to each other before forming the layer of the active material particles are also different.

Figure 3:
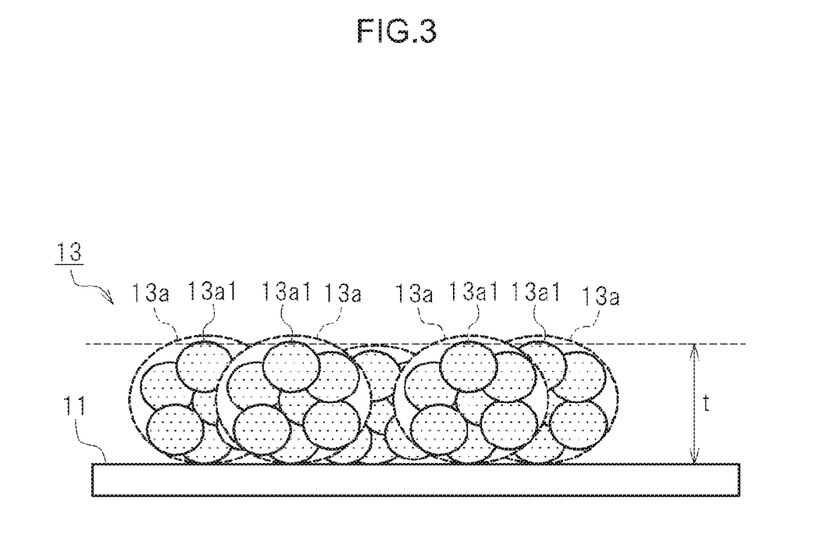
FIG. 3 is a schematic view schematically illustrating the state of the granulated particles 13a before they are pressed.
Figure 4:
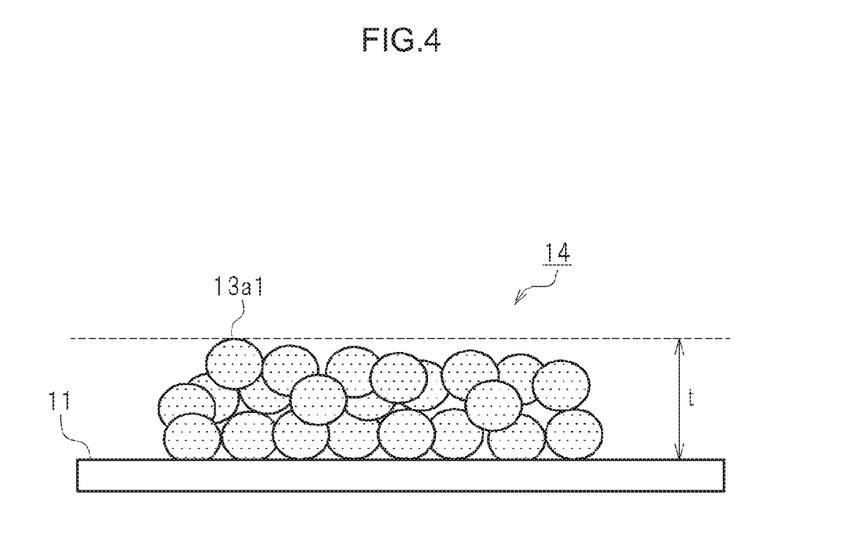
FIG. 4 is a schematic view schematically illustrating the state of the granulated particles 13a after they have been pressed.
Figure 5:
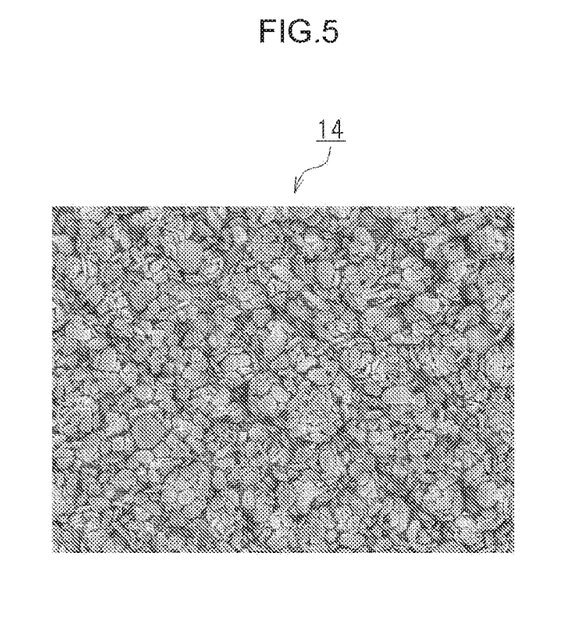
FIG. 5 is a photograph showing a surface of a layer 14 of active material particles 13a1 that is formed after the granulated particles 13a have been pressed.
Figure 6:
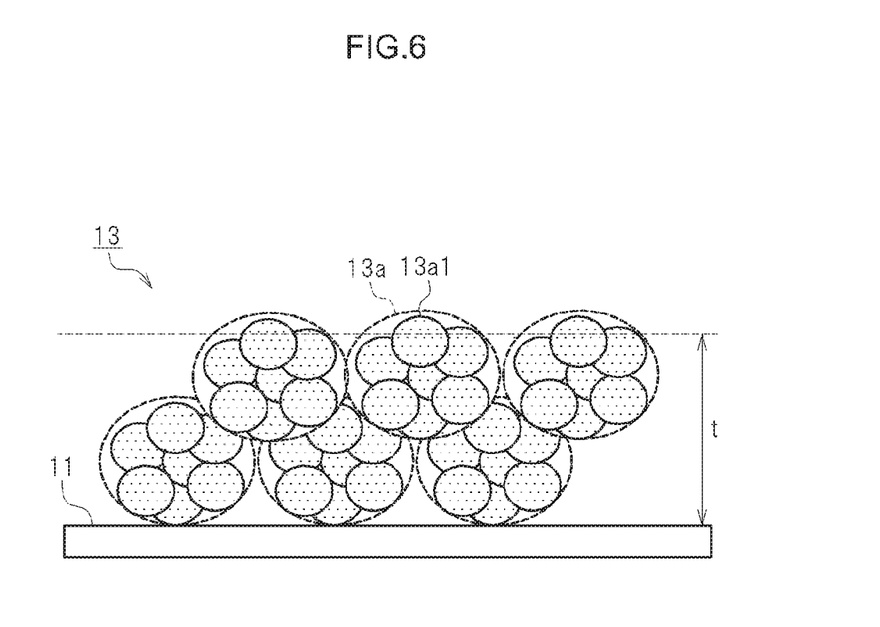
FIG. 6 is a schematic view schematically illustrating the state of granulated particles 13a before they are pressed in a manufacturing method of a comparative example.
Figure 7:
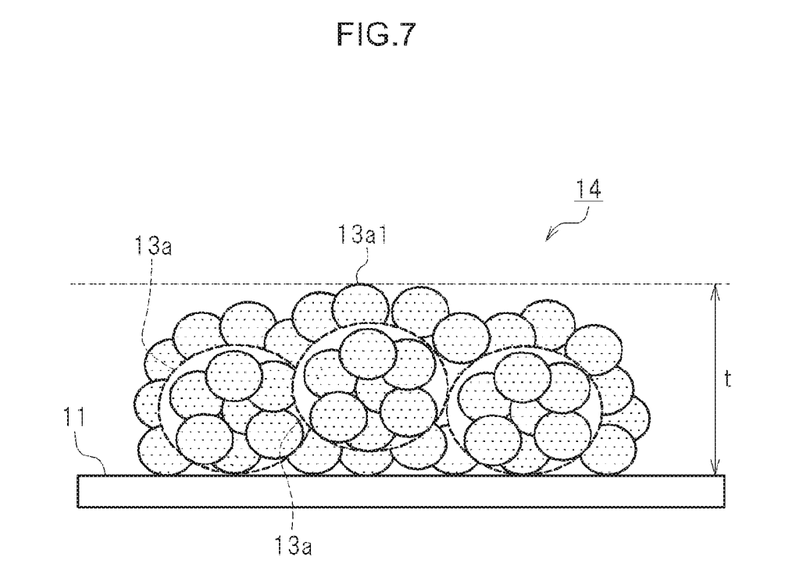
FIG. 7 is a schematic view schematically illustrating the state of the granulated particles 13a after they have been pressed in the manufacturing method of the comparative example.
Figure 8:
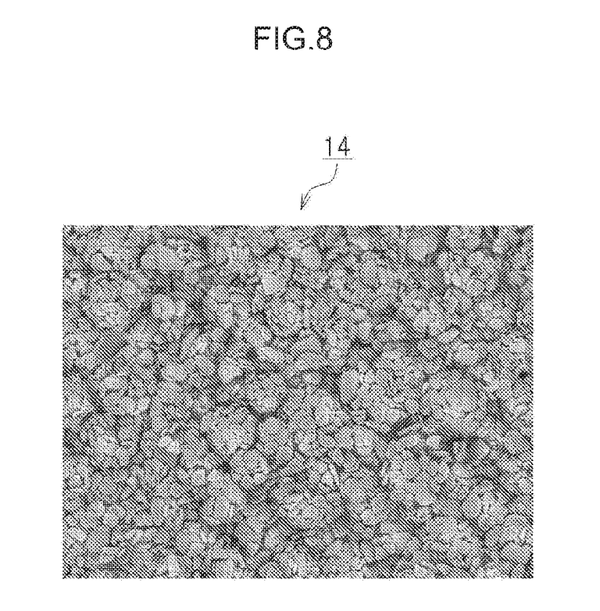
FIG. 8 is a photograph showing a surface of a layer 14 of the active material particles 13a1 after the granulated particles 13a have been pressed in the manufacturing method of the comparative example.

Based on the discovery as described above, the present inventors have found suitable conditions of the pressing and the granulated particles 13a to be supplied to the current collector 11 in order to obtain appropriate peel strength in the case where the layer 14 of the active material particles 13a1 is formed from the granulated particles 13a. FIGS. 3 and 4 schematically illustrate the step of pressing the granulated particles 13a in the method of manufacturing a lithium-ion secondary battery electrode sheet proposed herein. FIG. 3 is a view schematically illustrating the state of the granulated particles 13a before they are pressed. FIG. 4 is a view schematically illustrating the state of the granulated particles 13a after they have been pressed. FIG. 5 is a photograph showing a surface of the layer 14 of the active material particles 13a1 that is formed after the granulated particles 13a have been pressed. FIGS. 6 and 7 schematically illustrate the step of pressing granulated particles 13a in a comparative example of the method of manufacturing a lithium-ion secondary battery electrode sheet. FIG. 6 is a view schematically illustrating the state of the granulated particles 13a before they are pressed. FIG. 7 is a view schematically illustrating the state of the granulated particles 13a after they have been pressed. FIG. 8 is a photograph showing a surface of a layer 14 of the active material particles 13a1 after the granulated particles 13a have been pressed in the comparative example of the manufacturing method.

Here, referring to FIG. 3, the present inventors propose that, in the step of feeding the granulated particles 13a, the ratio (t/D50) should be set in the range (t/D50)<1, where D50 is the mean particle size of the granulated particles 13a fed onto the current collector 11 and t is the thickness of the layer 14 of the active material particles 13a1 that has been formed subsequent to the step of pressing. In other words, it is desirable that the mean particle size (D50) of the granulated particles 13a be greater than the thickness t of the layer 14 of the active material particles 13a1 after pressing. For example, it is desirable that the weight per unit area and the mean particle size of the granulated particles 13a be determined so that the ratio (t/D50) is in the range (t/D50)<1.

In this case, because the mean particle size (D50) of the granulated particles 13a is greater than the thickness t of the layer 14 of the active material particles 13a1 after pressing, as illustrated in FIG. 3, the particle configuration of the granulated particles 13a is destroyed at the time of the pressing, as illustrated in FIGS. 4 and 5. Accordingly, the binder 13a2 contained in the granulated particles 13a is squashed between the active material particles 13a1. As a result, the contact area between the active material particles 13a1 and the binder 13a2 is increased. Moreover, because the particle configuration of the granulated particles 13a is destroyed, the binder 13a2 adheres between the active material particles 13a1 that were contained in different granulated particles 13a, allowing the active material particles 13a1 to be bonded to each other with sufficient strength. Furthermore, since the active material particles 13a1 are also pressed against the current collector 11, the binder 13a2 is also squashed between the current collector 11 and the active material particles 13a1. As a result, sufficient bonding strength is also ensured between the current collector 11 and the active material particles 13a1.

In this embodiment, the current collector 11 is coated with the binder solution 12. For this reason, it is easy to obtain sufficient bonding strength between the current collector 11 and the active material particles 13a1. It is also possible that the granulated particles 13a to be fed onto the current collector 11 may contain granulated particles 13a that have a smaller particle size than the thickness t of the layer 14 of the active material particles 13a1 after pressing. It is also possible that granulated particles 13a whose particle configuration has not destroyed after pressing may remain partially in the granulated particles 13a to be fed onto the current collector 11. Thus, in the case of powder molding, the particle size of the granulated particles 13a may be determined so that the granulated particles 13a can be destroyed (i.e., squashed) with each other. Thereby, the binder 13a2 contained in the granulated particles 13a is squashed between the active material particles 13a1, and the adhesion strength thereof is obtained. As a result, a required bonding strength between the active material particles 13a1 can be obtained.

Here, in FIGS. 6 and 7, which illustrate a comparative example, the ratio (t/D50) of the thickness t of the layer 14 of the active material particles 13a1 after pressing and the mean particle size (D50) of the granulated particles 13a is in the range (t/D50)>1. In other words, as illustrated in FIG. 6, the mean particle size (D50) of the granulated particles 13a is smaller than the thickness t of the layer 14 of the active material particles 13a1 after pressing. For this reason, in the step of pressing the granulated particles 13a, the particle configuration remains unbroken in a relatively large proportion of the granulated particles 13a, as illustrated in FIGS. 7 and 8. In this case, the binder 13a2 may not serve its function sufficiently. Consequently, sufficient peel strength may not be obtained.

Figure 9A:
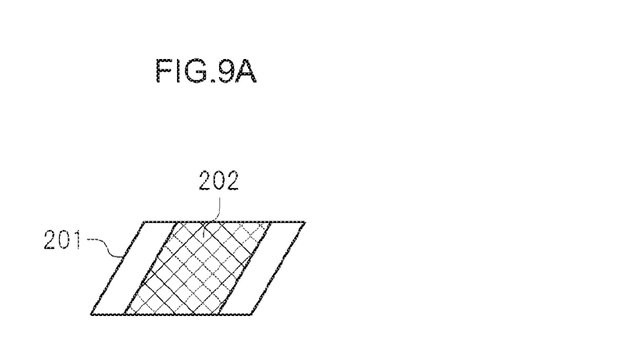
FIGS. 9A to 9F illustrate the procedure of preparing samples.
Figure 9B:
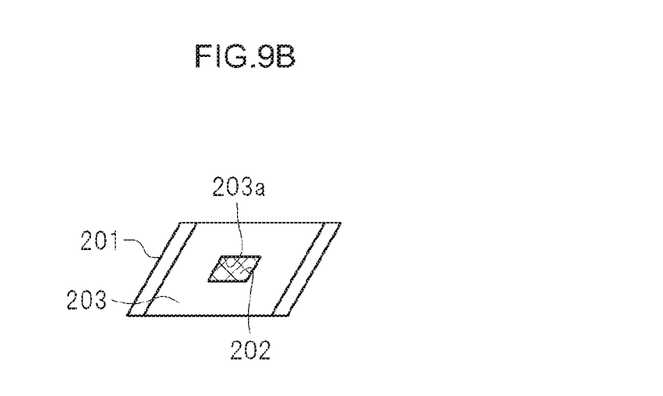

Herein, the present inventors prepared samples of the lithium-ion secondary battery electrode sheet to compare the peel strength thereof. FIGS. 9A to 9F show the procedure of preparing the samples. Here, an aluminum foil 201 having a thickness of 15 μm and 200 mm×200 mm dimensions is prepared, as shown in FIG. 9A. The binder solution 202 is applied to a widthwise center portion of such an aluminum foil 201 over a width of 160 mm. Next, as illustrated in FIG. 9B, the portion coated with the binder solution 202 is covered by a mask 203. An opening 203a with dimensions of 100 mm×100 mm is formed at a central portion of the mask 203, and the aluminum foil 201 coated with the binder solution 202 is exposed from the opening 203a. Here, it is desirable to use a PET sheet having a thickness of 500 μm for the mask 203.

Figure 9C:
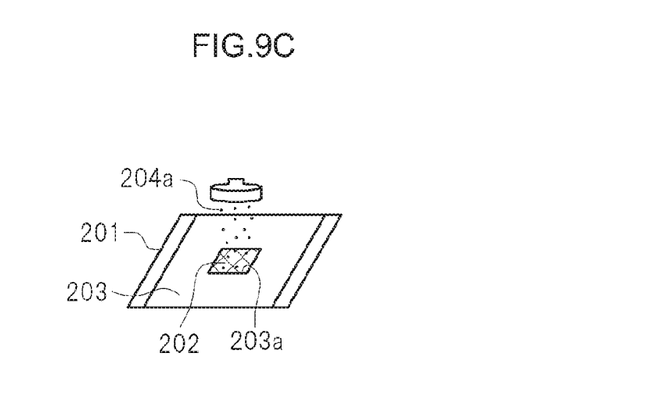
Figure 9D:
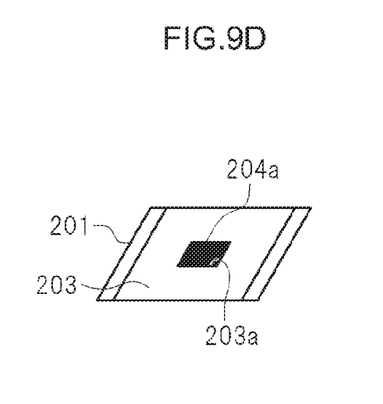
Figure 9E:
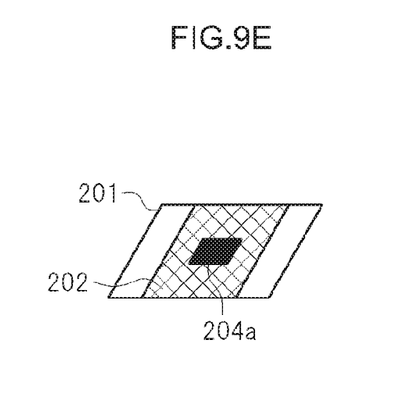
Figure 9F:
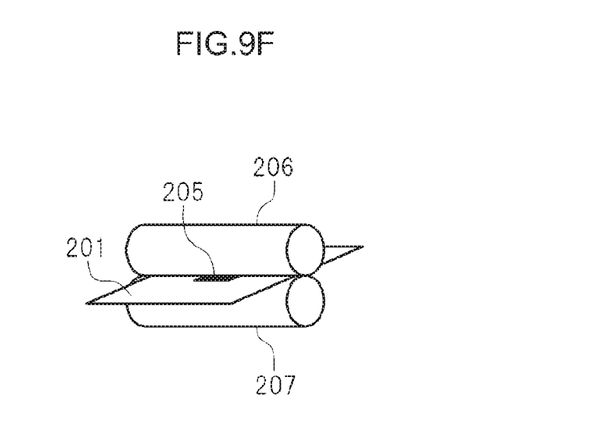

Next, as illustrated in FIG. 9C, granulated particles 204a having a mean particle size (D50) of 75 μm, which were prepared in advance, are sieved out onto the portion of the aluminum foil 201 exposed from the opening 203a and coated with the binder solution 202. Then, as illustrated in FIG. 9D, the granulated particles 204a that were sieved out onto the aluminum foil 201 is leveled to adjust the weight per unit area. Thereafter, the mask 203 is peeled away, as illustrated in FIG. 9E. Then, the aluminum foil 201 provided with the granulated particles 204a that were adjusted so as to have a predetermined weight per unit area is passed through the gap between the pressure rollers 206 and 207, as illustrated in FIG. 9F. At this stage, the pressing pressure was adjusted so that the density of the layer 205 of the active material particles formed from the granulated particles 204a became 1.35 g/cm$^3$.

Figure 10:
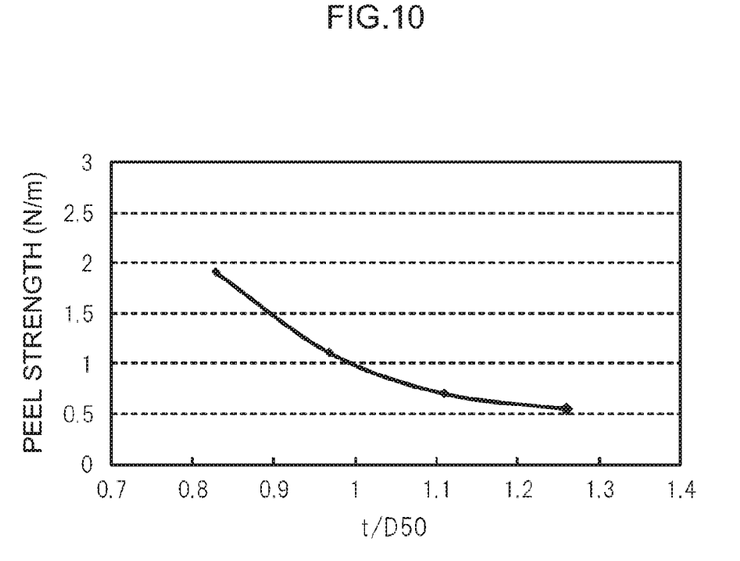
FIG. 10 is a graph illustrating the relationship between the ratio (t/D50) and the peel strength (N/m) in each of samples.

Here, four samples with varied weights per unit area of the granulated particles 204a sieved out on the aluminum foil 201 were prepared. The weight per unit area (mg/cm$^2$), the thickness t (μm) of the layer 205 of the active material particles after pressing, the mean particle size (D50) (μm) of the sieved-out granulated particles 204a, the ratio (t/D50), and the peel strength (N/m) for each of the samples are as shown in Table 1 below. FIG. 10 is a graph illustrating the relationship between the ratio (t/D50) and the peel strength (N/m) in each of the samples. Here, the peel strength is evaluated by a value determined by the 90-degree peeling test according to JIS K 6854. The thickness t (μm) of the layer 205 of the active material particles after pressing is evaluated by the mean value of the thickness values at arbitrary four points in each sample, which are measured by a film thickness gauge 547-315 manufactured by Mitutoyo Corp.

In this case, the density of the formed layer 205 of the granulated particles 204a was almost uniform, about 1.35 (g/cm$^3$), but the peel strength varied. Here, sample 1 had a weight per unit area of 8.5 (mg/cm$^2$), a ratio (t/D50) of 0.83, and a peel strength of 1.9 (N/m). Sample 2 had a weight per unit area of 9.8 (mg/cm$^2$), a ratio (t/D50) of 0.97, and a peel strength of 1.1 (N/m). Sample 3 had a weight per unit area of 11.5 (mg/cm$^2$), a ratio (t/D50) of 1.11, and a peel strength of 0.7 (N/m). Sample 4 had a weight per unit area of 13.1 (mg/cm$^2$), a ratio (t/D50) of 1.26, and a peel strength of 0.55 (N/m). Thus, there is a tendency that the smaller the ratio (t/D50) of the thickness t of the layer 205 of the active material particles after pressing to the mean particle size (D50) of the granulated particles 204a fed on the aluminum foil 201 serving as the current collector is, the higher the peel strength. In addition, because the pressing pressure is constant herein, the thickness t of the layer 205 of the active material particles after pressing can be adjusted by varying the weight per unit area of the granulated particles 13a.

According to the discovery by the present inventors, it is desirable that the ratio (t/D50) be less than 1, where D50 is the mean particle size (D50) of the granulated particles 204a and t is the thickness of the layer 205 of the active material particles after pressing. In this case, there is a tendency that the layer 205 of the active material particles formed in the lithium-ion secondary battery electrode sheet results in a high peel strength consistently.

In addition, from the viewpoint of consistently obtaining a lithium-ion secondary battery electrode sheet having a high peel strength, it is desirable that the mean particle size (D50) of the granulated particles 204a be sufficiently large relative to the thickness t of the layer 205 of the active material particles after pressing. However, if the mean particle size (D50) of the granulated particles 204a is excessively large relative to the thickness t of the layer 205 of the active material particles after pressing, it is likely to cause unevenness in the weight per unit area. From such viewpoints, it is desirable that the mean particle size (D50) of the granulated particles 204a not be excessively large relative to the thickness t of the layer 205 of the active material particles after pressing. From such viewpoints, it is desirable that the ratio (t/D50) be in the range 0.5<(t/D50)<1 in the step of pressing the granulated particles 204a, according to the discovery by the present inventors.

In addition, for example, it is desirable that the thickness t of the layer 14 of the active material particles 13a1 after the step of pressing the granulated particles 13a be equal to or greater than two times the mean particle size (D50) of the active material particles 13a1 contained in the granulated particles 13a. In this case, the thickness t of the layer of the active material particles after the step of pressing is ensured to be large relative to the mean particle size (D50) of the active material particles 13a1 contained in the granulated particles 13a. Therefore, the layer 14 of the active material particles is likely to be formed appropriately.

Hereinabove, various embodiments of the method of manufacturing a lithium-ion secondary battery electrode sheet proposed herein have been described, but the method, according to the present invention, of manufacturing a lithium-ion secondary battery electrode sheet is not limited by any of the foregoing embodiments, unless otherwise stated.

For example, in the embodiment shown in FIG. 1, the layer of the active material particles 13a1 is formed by feeding the granulated particles 13a onto a predetermined region of the current collector 11 in the width direction, leveling the granulated particles 13a, and pressing the granulated particles 13a, while the strip-shaped current collector 11 is being conveyed along the longitudinal direction. The method of manufacturing a lithium-ion secondary battery electrode sheet proposed herein is not limited to such an embodiment. For example, as illustrated in FIGS. 9A to 9F, a current collector 201 having a predetermined shape is prepared (see FIG. 9A). Subsequently, granulated particles 204a are fed onto the current collector 201 (see FIG. 9C). Next, the granulated particles 204a fed on the current collector 201 are leveled (see FIG. 9D). Then, the leveled granulated particles 204a are pressed (see FIG. 9E). In this way, the method of manufacturing a lithium-ion secondary battery electrode sheet proposed herein is applicable, not only to the case in which predetermined processes are carried out while the current collector 201 is being conveyed in a roll-to-roll process, but also to the case in which the layer 205 of the active material particles is formed on each single sheet of the current collector 201, in other words, to a sheet-by-sheet system.

The electrode sheet manufactured by the manufacturing method proposed herein offers good productivity. The manufacturing method proposed herein can yield an electrode sheet with stable product quality. Therefore, it can be used suitably for such applications that require mass productivity and stable performance. An example of such applications is a power source (driving power source) for electric motors incorporated in vehicles. The types of the vehicles are not particularly limited, and examples include plug-in hybrid vehicles (PHVs), hybrid vehicles (HVs), electric vehicles (EVs), electric trucks, small-sized motorcycles, power assisted bicycles, electric powered wheelchairs, and electric railroads. The non-aqueous electrolyte secondary battery may be used in the form of a battery module, in which a plurality of the batteries are connected in series and/or in parallel to each other.

REFERENCE SIGNS LIST

10—Manufacturing apparatus
11—Current collector (current collector foil)
12—Binder solution
13—Powder material
13a—Granulated particle
13a1—Active material particle
13a2—Binder
14—Layer of active material particles 13a1 after pressing
21—Conveyor device
21a—Conveyor roller
22—Coating device
22a—Gravure roller
22b—Reservoir
22c—Backing roller
24—Feeding device
24a—Hopper
25—Squeegee
26, 27—Pressure roller
201—Aluminum foil (current collector)
202—Binder solution
203—Mask
203a—Opening
204a—Granulated particles
205—Layer of active material particles after pressing
206, 207—Pressure roller
F—Conveying direction
t—Thickness of the layer of active material particles after pressing

The invention claimed is:

1. A method of manufacturing a lithium-ion secondary battery electrode sheet, comprising the steps of:

preparing a current collector;
preparing a mixture in which active material particles and a first binder are mixed with a first solvent;
preparing granulated particles containing the active material particles and the first binder by spraying the mixture in a dry atmosphere;
preparing a binder solution in which a second binder is mixed with a second solvent;
applying the binder solution onto the current collector;
feeding the granulated particles onto the current collector after applying the binder solution;
leveling the granulated particles fed on the current collector; and
pressing and destroying the leveled granulated particles, wherein
in the step of preparing granulated particles, a mean particle size of the prepared granulated particles is from 60 μm to 100 μm, and wherein
in the step of feeding the granulated particles, the ratio (t/D50) is less than 1, where D50 is the mean particle size of the granulated particles fed onto the current collector and t is the thickness of a layer of the active material particles that has been formed subsequent to the step of pressing.

2. The method according to claim 1, wherein the ratio (t/D50) is greater than 0.5.

3. The method according to claim 1, wherein the first binder and the second binder are a same material.

4. The method according to claim 1, wherein the first binder and the second binder are different materials.

5. The method according to claim 1, wherein the pressing and destroying of the leveled granulated particles increases a number of contact locations of the first binder with the active material particles and the current collector.

6. The method according to claim 1, wherein the pressing and destroying of the leveled granulated particles increases a bonding strength between the active material particles.

7. The method according to claim 1, wherein the pressing and destroying of the leveled granulated particles adheres the first binder between active material particles contained in different granulated particles.

8. The method according to claim 1, wherein the pressing and destroying of the leveled granulated particles increases a bonding strength between active material particles in different granulated particles.

9. The method according to claim 1, wherein the first solvent and the second solvent are different materials.

* * * * *